(12) United States Patent
Yasuhara

(10) Patent No.: US 7,942,833 B2
(45) Date of Patent: May 17, 2011

(54) MOTION GUIDE DEVICE, AND ITS CONTROL SYSTEM AND CONTROL PROGRAM

(75) Inventor: Ken Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 619 days.

(21) Appl. No.: 12/065,015

(22) PCT Filed: Jul. 12, 2006

(86) PCT No.: PCT/JP2006/313865
§ 371 (c)(1),
(2), (4) Date: Feb. 27, 2008

(87) PCT Pub. No.: WO2007/029418
PCT Pub. Date: Mar. 15, 2007

(65) Prior Publication Data
US 2009/0270766 A1    Oct. 29, 2009

(30) Foreign Application Priority Data
Sep. 2, 2005 (JP) .................. 2005-254610

(51) Int. Cl.
| | |
|---|---|
| H03L 7/00 | (2006.01) |
| G01N 27/00 | (2006.01) |
| A61F 5/00 | (2006.01) |
| A61B 5/103 | (2006.01) |
| A61B 5/117 | (2006.01) |
| A61H 3/00 | (2006.01) |
| A61H 1/00 | (2006.01) |
| A61H 1/02 | (2006.01) |
| A63B 24/00 | (2006.01) |
| A61N 1/00 | (2006.01) |

(52) U.S. Cl. ................ 600/595; 135/67; 331/2; 331/65; 482/7; 482/8; 482/9; 482/66; 600/587; 601/5; 601/34; 601/35; 602/16; 602/23; 607/49; 623/24; 623/25

(58) Field of Classification Search ................ 331/2, 65; 623/24, 25; 602/16, 23; 600/587, 595; 135/67; 482/7–9, 66; 601/5, 34, 35; 607/49
See application file for complete search history.

(56) References Cited

U.S. PATENT DOCUMENTS
4,557,257 A * 12/1985 Fernandez et al. ................ 602/5
(Continued)

FOREIGN PATENT DOCUMENTS
EP       1547567 A1    6/2005
(Continued)

*Primary Examiner* — Max Hindenburg
*Assistant Examiner* — Sean P Dougherty
(74) *Attorney, Agent, or Firm* — Rankin, Hill & Clark LLP

(57) ABSTRACT

A device for inducing a user's motion in a rhythm responsive to a motion rhythm after the user's motion rhythm changes suddenly. The walking assist device generates a first oscillator which attains mutual entrainment with a user's hip joint angular velocity to reflect a natural angular velocity. On the other hand, a new natural angular velocity is set based on the phase difference between the hip joint angular velocity and the first oscillator. A second oscillator which oscillates in rhythm reflecting the natural angular velocity is generated. An inducing oscillator is generated based on the second oscillator, and a torque responsive to the inducing oscillator acts on the user's body. If the magnitude of a periodic variation in the hip joint angular velocity exceeds a threshold value, a second oscillator which oscillates in rhythm reflecting the angular velocity of the first oscillator instead of the natural angular velocity is generated.

9 Claims, 6 Drawing Sheets

U.S. PATENT DOCUMENTS

| | | | |
|---|---|---|---|
| 4,697,808 A * | 10/1987 | Larson et al. | 482/51 |
| 4,760,850 A * | 8/1988 | Phillips et al. | 607/49 |
| 4,946,156 A * | 8/1990 | Hart | 482/66 |
| 5,020,790 A * | 6/1991 | Beard et al. | 482/4 |
| 5,476,441 A * | 12/1995 | Durfee et al. | 602/23 |
| 5,961,541 A * | 10/1999 | Ferrati | 607/49 |
| 6,821,233 B1 * | 11/2004 | Colombo et al. | 482/54 |
| 7,065,408 B2 * | 6/2006 | Herman et al. | 607/49 |
| 7,153,242 B2 * | 12/2006 | Goffer | 482/66 |
| 7,416,538 B2 * | 8/2008 | Katoh et al. | 602/16 |
| 7,429,253 B2 * | 9/2008 | Shimada et al. | 602/16 |
| 7,481,742 B2 * | 1/2009 | Katoh et al. | 482/51 |
| 7,559,909 B2 * | 7/2009 | Katoh et al. | 602/16 |
| 7,578,799 B2 * | 8/2009 | Thorsteinsson et al. | 602/5 |
| 7,628,766 B1 * | 12/2009 | Kazerooni et al. | 602/16 |
| 7,744,511 B2 * | 6/2010 | Grigoriev et al. | 482/124 |

FOREIGN PATENT DOCUMENTS

| | | |
|---|---|---|
| JP | 08-278786 | 10/1996 |
| JP | 2002-126152 | 5/2002 |
| JP | 2003-135543 | 5/2003 |
| JP | 2004-073649 | 3/2004 |
| JP | 2005-118466 | 5/2005 |
| JP | 2005-224318 | 8/2005 |

* cited by examiner

MOTION GUIDE DEVICE, AND ITS CONTROL SYSTEM AND CONTROL PROGRAM

TECHNICAL FIELD

The present invention relates to a device for inducing a user's motion, a system for controlling the device, and a program for providing a computer attached to the device with functions for controlling the device.

BACKGROUND ART

Conventionally, there has been suggested a device which assists a user in walking by applying a torque around a leg joint (a hip joint, a knee joint, or an ankle joint) to a user's body (for example, refer to Japanese Patent Laid-Open No. 2003-135543). In addition, there has been suggested a system which controls the walking assist device in such a way as to add autonomy to the walking assist rhythm of the walking assist device while following changes in the user's locomotion rhythm (for example, refer to Japanese Patent Laid-Open No. 2004-073649).

DISCLOSURE OF THE INVENTION

Problem to be Solved by the Invention

When the user changes the locomotion rhythm suddenly, however, the walking assist rhythm of the walking assist device does not follow the rapid change and it can cause an uncomfortable feeling or a feeling of anxiety in the user. In other words, the rhythm inducing the user's motion does not follow the rapid change in the user's motion rhythm and it is likely to cause an uncomfortable feeling or the like in the user.

Therefore, it is an object of the present invention to provide a device capable of inducing a user's motion in an appropriate rhythm responsive to a motion rhythm even after the user's motion rhythm changes suddenly, a system capable of controlling the device, and a program which provides a computer attached to the motion inducing device with functions of controlling the device.

Means for Solving the Problem

To achieve the above object, according to the present invention, there is provided a motion inducing device for inducing a user's motion according to an inducing oscillator, comprising: a motion oscillator measurement means which measures a user's motion oscillator; a first oscillator generation means which generates a first oscillator which attains mutual entrainment with the motion oscillator measured by the motion oscillator measurement means in such a way as to reflect a natural angular velocity: a natural angular velocity setting means which sets a new natural angular velocity on the basis of a phase difference between the motion oscillator measured by the motion oscillator measurement means and the first oscillator generated by the first oscillator generation means; a second oscillator generation means which generates a second oscillator oscillating in rhythm reflecting the natural angular velocity set by the natural angular velocity setting means; and an inducing oscillator generation means which generates the inducing oscillator on the basis of the second oscillator generated by the second oscillator generation means, wherein the second oscillator generation means generates the second oscillator which oscillates in rhythm reflecting one or both of the angular velocity of the motion oscillator measured by the motion oscillator measurement means and the angular velocity of the first oscillator generated by the first oscillator generation means, instead of the natural angular velocity set by the natural angular velocity setting means, when the magnitude of periodic variation (the variation of the period) in the motion oscillator measured by the motion oscillator measurement means exceeds a threshold value.

According to the motion inducing device of the present invention, in the case of a small change in the user's motion rhythm, in other words, if the magnitude of periodic variation in the motion oscillator is equal to or lower than the threshold value, the user's motion is induced as described below. Note that the user's "motion" can include walking, running, handwork required for manufacturing, and other various motions.

First, the "first oscillator" is generated which oscillates in an autonomous rhythm reflecting the natural angular velocity while harmonizing with the rhythm of the user's motion oscillator due to the "mutual entrainment" effect. Note that the concept of the term "oscillates" includes a behavior where a real or virtual object shakes at substantially regular intervals and besides widely includes a change in time. Moreover, the concept of the term "oscillator" includes an electrical signal whose value changes in time or a function or the like defined as one whose value changes in time in software. On the other hand, the first oscillator is likely to have an inappropriate phase difference from the user's motion oscillator from the viewpoint of matching the user's motion rhythm with the target rhythm while harmonizing the user's motion rhythm with the inducing rhythm of the motion inducing device. Therefore, if the inducing oscillator is directly generated from the first oscillator, the user's motion rhythm induced by the inducing oscillator might deviate from the target rhythm.

Therefore, the "new natural angular velocity" is set according to the phase difference between the user's motion oscillator and the first oscillator. Thereby, the new natural angular velocity becomes equivalent to an angular velocity of an appropriate oscillator from the viewpoint of inducing the user's motion in such a way as to match the user's motion rhythm with the target rhythm while harmonizing with the user's motion rhythm identified by the motion oscillator according to the target phase difference. Thereafter, a new first oscillator is repeatedly generated in such a way as to reflect a new natural angular velocity, by which the deviation of the phase difference between the motion oscillator and the first oscillator from the target phase difference can be gradually reduced while harmonizing the rhythm of the first oscillator with the rhythm of the motion oscillator. Thereby, even if the user's motion rhythm changes suddenly, it is possible to achieve appropriate followability of the inducing oscillator to the change from the viewpoint of preventing discomfort or the like from being brought to the user and possible to cause the user's motion rhythm to gradually coincide with the target rhythm at a moderate pace.

Accordingly, the "second oscillator" is generated so as to reflect the new natural angular velocity and further the "inducing oscillator" is generated on the basis of the second oscillator, which enables the user's motion rhythm to match the target rhythm while harmonizing the user's motion rhythm induced by the inducing oscillator with the rhythm of the inducing oscillator. The harmony between the user's motion rhythm and the rhythm of the inducing oscillator harmonizes the inducing rhythm of the motion inducing device with the user's motion rhythm and harmonizes the user's motion rhythm with the inducing rhythm of the motion inducing device, and thus the harmonization (mutual adaptation) is established between the user (human) and the device (machine).

On the other hand, in the case of a significant change in the user's motion rhythm, in other words, if the magnitude of periodic variation in the motion oscillator exceeds the threshold value, the second oscillator is generated on the basis of one or both of the "angular velocity of the motion oscillator" and the "angular velocity of the first oscillator," instead of the "natural angular velocity."

When the second oscillator is generated on the basis of the angular velocity of the motion oscillator, the generation process of the first oscillator and the setting process of the natural angular velocity can be omitted. When the second oscillator is generated on the basis of the angular velocity of the first motion oscillator, or the angular velocity of the motion oscillator and the angular velocity of the first oscillator, the setting process of the natural angular velocity can be omitted. Some processes performed in the case of a small change in the user's motion rhythm can be omitted as described above, by which the following corresponding reduction in time can be achieved: the time from the measurement of the motion oscillator, through the generation of the inducing oscillator, to the supply of the inducing oscillator to the user.

If the inducing oscillator is directly generated from the motion oscillator or the first oscillator, the inducing rhythm of the motion inducing device might excessively deviate from the motion rhythm in response to a sudden change in the user's motion rhythm and it might bring significant discomfort to the user. It is more noticeable in a situation where the user's motion rhythm is very likely to change significantly so as to deviate widely from the target rhythm.

Therefore, the "second oscillator" is generated according to one or both of the angular velocity of the motion oscillator and the angular velocity of the first oscillator as described above and the "inducing oscillator" is generated on the basis of the second oscillator, which can prevent the motion rhythm from significantly deviating from the inducing rhythm.

Additionally, the angular velocity of the motion oscillator directly reflects the user's motion rhythm. Moreover, the user's motion rhythm is strongly reflected on the angular velocity of the first oscillator which oscillates in the autonomous rhythm reflecting the natural angular velocity while harmonizing with the rhythm of the motion oscillator due to the "mutual entrainment" effect with the motion oscillator as described above. Therefore, the rhythm of the second oscillator reflecting one or both of the angular velocity of the motion oscillator and the angular velocity of the first oscillator reflects the user's motion rhythm that has suddenly changed. Accordingly, the "inducing oscillator" is generated on the basis of the second oscillator, whereby the rhythm of the inducing oscillator can be appropriate from the viewpoint of inducing the user's motion in such a way as to match the user's motion rhythm with the target rhythm while harmonizing with the user's motion rhythm.

As described above, according to the motion inducing device of the present invention, even after the user's motion rhythm changes suddenly, the user's motion can be induced in an appropriate rhythm responsive to the motion rhythm.

Furthermore, the motion inducing device of the present invention may further comprises: a state measurement means which measures one or both of user's motion and physiological states; and a threshold value setting means which sets the threshold value according to one or both of the user's motion and physiological states determined by the state measurement means.

According to the motion inducing device of the present invention, the threshold value is set according to one or both of the user's "motion state" and "physiological state" in view of a fact that it would be better to increase the response of the inducing rhythm made by the motion inducing device to a change of the user's motion rhythm in some cases, while it would be better to decrease the response in other cases, depending on the user's "motion state" or "physiological state."

In the case of a significant change in the user's motion rhythm on that basis, in other words, if the magnitude of periodic variation in the motion oscillator exceeds the threshold value, the setting process of the natural angular velocity and the like can be omitted and then the inducing oscillator can be generated as described above. Furthermore, the "second oscillator" is generated which oscillates in rhythm reflecting one or both of the angular velocity of the motion oscillator and the angular velocity of the first oscillator, instead of the natural angular velocity, and the "inducing oscillator" is generated on the basis of the second oscillator. Thereby, the response of the inducing rhythm made by the motion inducing device to a change in the user's motion rhythm can be adjusted to an appropriate one, in view of the user's motion state and physiological state.

The user's "motion state" can include an upward walking state where the user ascends a slope or stairs, a level walking state where the user walks on substantially level ground, a downward walking state where the user descends a slope or stairs, a quick walking state where the user walks quickly, a slow walking state where the user walks slowly, and the like. Additionally, the user's "physiological state" can include a state where the user's degree of fatigue is high, a state where the user's degree of fatigue is low, a state where the user's heart rate or perspiration amount is high, a state where the user's heart rate is low, and the like.

Furthermore, in the motion inducing device according to the present invention, the inducing oscillator generation means may generate an inducing oscillator including the second oscillator generated by the second oscillator generation means and a first inducing oscillator having a first potential for bringing the motion oscillator responsive to a user's motion scale measured by the motion oscillator measurement means close to a target value responsive to a user's target motion scale according to the natural angular velocity set by the natural angular velocity setting means.

According to the motion inducing device of the present invention, the "first inducing oscillator" has the first potential for bringing the motion oscillator responsive to the user's motion scale close to its target value. The first potential is provided according to a new natural angular velocity corresponding to the angular velocity of an appropriate oscillator from the viewpoint of inducing the user's motion in such a way as to match the user's motion rhythm with the target rhythm while harmonizing with the user's motion rhythm. Therefore, the generation of the inducing oscillator including the first inducing oscillator enables the user's motion to be induced in such a way as to achieve a harmony between the user's motion rhythm and the inducing oscillator rhythm and a match between the user's motion rhythm and the target rhythm, and also induced so that the value of the motion oscillator responsive to the user's motion scale approaches the target value, in other words, so that the user's motion scale approaches the target scale.

Furthermore, in the motion inducing device according to the present invention, the inducing oscillator generation means generates the first inducing oscillator, which includes a product of a first coefficient responsive to the first potential as a function of the natural angular velocity set by the natural angular velocity setting means, a function of a deviation between the first motion oscillator value and the target value, and the second oscillator.

According to the motion inducing device of the present invention, the first inducing oscillator is represented as an elastic force of elastic elements such as virtual springs or the like which have the first coefficients responsive to the first potential as elastic coefficients (spring coefficients) and which restores the value of the motion oscillator responsive to the user's motion scale to the target value. This enables the user's motion to be assisted with the rhythm and scale reflecting the properties of the elastic elements of the user's body such as the elastic force generated during the transition from the muscle contraction state to the muscle stretch state.

Furthermore, in the inducing device according to the present invention, the inducing oscillator generation means generates an inducing oscillator including a second inducing oscillator having a second potential which prevents an increase in the absolute value of the motion oscillator, according to the natural angular velocity set by the natural angular velocity setting means and the time derivative of the motion oscillator responsive to a user's motion scale measured by the motion oscillator measurement means.

According to the motion inducing device of the present invention, the "second inducing oscillator" has the second potential for preventing the increase in the absolute value of the motion oscillator responsive to the user's motion scale. The second potential is provided according to a new natural angular velocity corresponding to the angular velocity of an appropriate oscillator from the viewpoint of inducing the user's motion in such a way as to match the user's motion rhythm with the target rhythm while harmonizing with the user's motion rhythm. Therefore, the generation of the inducing oscillator including the second inducing oscillator enables the user's motion to be induced in such a way as to achieve a harmony between the user's motion rhythm and the inducing oscillator rhythm and a match between the user's motion rhythm and the target rhythm, and also induced so that the user's motion scale approaches the target scale while preventing the increase in the absolute value of the motion oscillator according to the time derivative of the motion oscillator responsive to the user's motion scale.

Furthermore, in the motion inducing device according to the present invention, the inducing oscillator generation means generates a second inducing oscillator which includes a product of a second coefficient responsive to the second potential as a function of the natural angular velocity set by the natural angular velocity setting means, a function of the time derivative of the motion oscillator responsive to the user's motion scale, and the second oscillator.

According to the motion inducing device of the present invention, the second inducing oscillator is represented as a damping force of damping elements such as virtual dampers or the like which have the second coefficients responsive to the second potential as damping coefficients (damper coefficients) and which prevents the increase in the absolute value of the second motion oscillator. This enables the user's motion to be assisted with the rhythm and scale reflecting the properties of the damping elements of the user's body such as the viscous force generated during the transition from the muscle stretch state to the muscle flexed state.

To achieve the above object, according to the present invention, there is provided a control system which controls a device for inducing a user's motion according to an inducing oscillator, comprising: a motion oscillator measurement means which measures a user's motion oscillator; a first oscillator generation means which generates a first oscillator which attains mutual entrainment with the motion oscillator measured by the motion oscillator measurement means in such a way as to reflect a natural angular velocity: a natural angular velocity setting means which sets a new natural angular velocity on the basis of a phase difference between the motion oscillator measured by the motion oscillator measurement means and the first oscillator generated by the first oscillator generation means; a second oscillator generation means which generates a second oscillator oscillating in rhythm reflecting the natural angular velocity set by the natural angular velocity setting means; and an inducing oscillator generation means which generates the inducing oscillator on the basis of the second oscillator generated by the second oscillator generation means, wherein the second oscillator generation means generates the second oscillator which oscillates in rhythm reflecting one or both of the angular velocity of the motion oscillator measured by the motion oscillator measurement means and the angular velocity of the first oscillator generated by the first oscillator generation means, instead of the natural angular velocity set by the natural angular velocity setting means, when the magnitude of a periodic variation in the motion oscillator measured by the motion oscillator measurement means exceeds a threshold value.

According to the control system of the present invention, even after the user's motion rhythm changes suddenly, the motion inducing device is controlled in such a way that the user's motion is induced in an appropriate rhythm responsive to the motion rhythm.

To achieve the above object, according to the present invention, there is provided a control program which provides a computer attached to a device for inducing a user's motion according to an inducing oscillator with functions for controlling the device including: a motion oscillator measurement function of measuring a user's motion oscillator; a first oscillator generation function of generating a first oscillator which attains mutual entrainment with the motion oscillator measured by the motion oscillator measurement function in such a way as to reflect a natural angular velocity: a natural angular velocity setting function of setting a new natural angular velocity on the basis of a phase difference between the motion oscillator measured by the motion oscillator measurement function and the first oscillator generated by the first oscillator generation function; a second oscillator generation function of generating a second oscillator oscillating in rhythm reflecting the natural angular velocity set by the natural angular velocity setting function; an inducing oscillator generation function of generating the inducing oscillator on the basis of the second oscillator generated by the second oscillator generation function; and a function of generating the second oscillator as a part of the second oscillator generation function, wherein the second oscillator oscillates in rhythm reflecting one or both of the angular velocity of the motion oscillator measured by the motion oscillator measurement function and the angular velocity of the first oscillator generated by the first oscillator generation function, instead of the natural angular velocity set by the natural angular velocity setting function when the magnitude of a periodic variation in the motion oscillator measured by the motion oscillator measurement function exceeds a threshold value.

According to the control program of the present invention, even after the user's motion rhythm changes suddenly, the computer attached to the motion inducing device is provided with the functions for controlling the motion inducing device in such a way that the user's motion can be induced in an appropriate rhythm responsive to the motion rhythm.

BEST MODE FOR CARRYING OUT THE INVENTION

Preferred embodiments of a motion inducing device and its control system and control program according to the present invention will be described below with reference to accompanying drawings.

Basically subscripts L and R will be attached to parameters to make a distinction between left and right for walker's legs or the like, though the subscripts L and R may be omitted for simplicity of notation in some cases.

Figure 1:
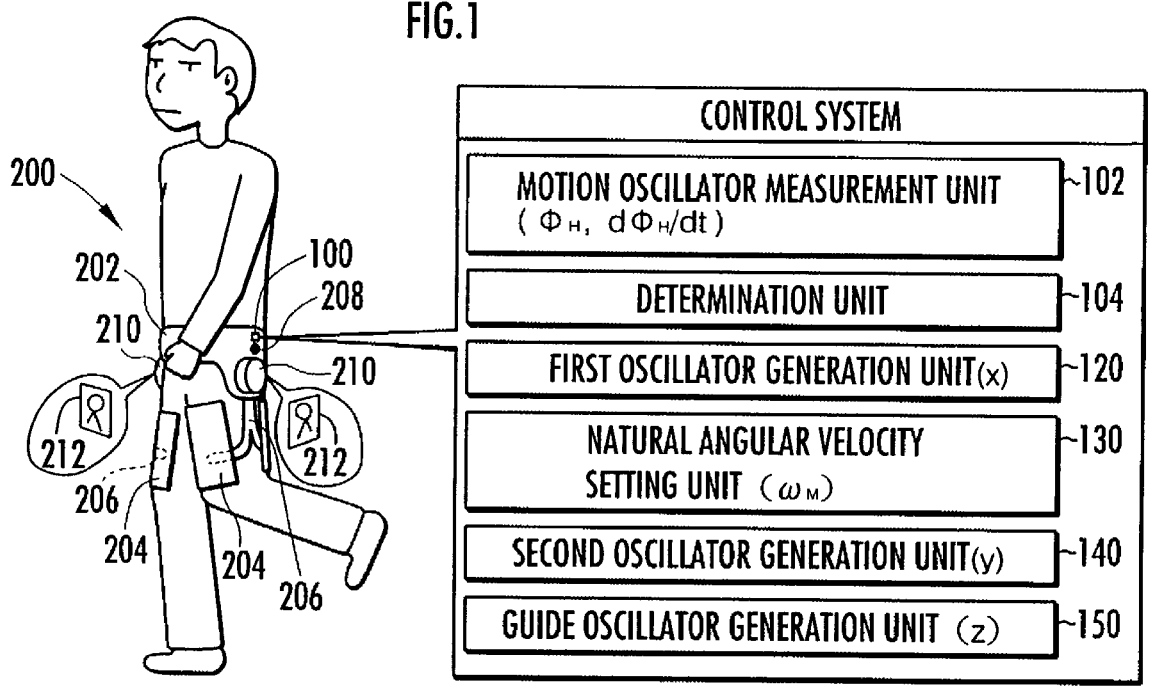
FIG. 1 is an illustrative block diagram showing a motion inducing device and its control system according to the present invention.

A walking assist device (motion inducing device) 200 shown in FIG. 1 includes a waist orthosis 202, a thigh orthosis 204, a force transmitting member 206, a battery 208, an actuator (electric motor) 210, and a hip joint angle sensor 212.

The waist orthosis 202 is made of rigid and flexible materials combined with each other and it is attached to a user's waist. The thigh orthosis 204 is also made of combined rigid and flexible materials and it is attached to the front and back of a user's thigh. A force transmitting member is made of lightweight rigid plastic or any other material having shape retention, extending downward from the side of the user's waist along the user's thigh and then bifurcated toward the front and back of the thigh, and is connected to the actuator 210 and the respective thigh orthoses 204. The battery 208 is housed in the waist orthosis 202 (for example, fixed between a plurality of materials constituting the waist orthosis 202) and supplies electric power to the actuator 210 and the like. The actuator 210 is housed in the waist orthosis 202 and applies a force to the user's thigh via the force transmitting member 206 and the thigh orthosis 204. The hip joint angle sensor 212 is composed of a rotary encoder and the like provided on the side of the user's waist and outputs a signal responsive to a hip joint angle.

The control system shown in FIG. 1 is composed of a computer 100 as hardware housed in the waist orthosis 202 and a "control program" of the present invention as software which provides the computer 100 with functions for controlling the walking assist device 200.

The control system includes a motion oscillator measurement unit 102, a determination unit 104, a first oscillator generation unit 120, a natural angular velocity setting unit 130, a second oscillator generation unit 140, and an inducing oscillator generation unit 150. Each unit is composed of a CPU, ROM, RAM or other memories, I/O and the like as hardware and the "control program" of the present invention as software which provides the computer composed of the CPU and the like with various functions (the same applies hereinafter). Note that the CPU and the like of each unit can be separate from those of other units or can be shared among the units.

The motion oscillator measurement unit 102 measures a hip joint angle $\phi_H$ responsive to the user's motion scale as a user's "motion oscillator" and a hip joint angular velocity $d\phi_H/dt$ which is its time derivative, on the basis of an output of the hip joint angle sensor 212.

The determination unit 104 determines whether the magnitude of periodic variation in the hip joint angular velocity $d\phi_H/dt$ measured by the motion oscillator measurement unit 102 exceeds a threshold value $\delta$.

The first oscillator generation unit 120 generates a first oscillator x according to a "first model" on the basis of the hip joint angular velocity $d\phi_H/dt$ measured by the motion oscillator measurement unit 102 and a natural angular velocity $\omega_M$.

The natural angular velocity setting unit 130 sets a new natural angular velocity $\omega_M$ on the basis of a phase difference (a first phase difference) $\delta\theta_1$ between the hip joint angular velocity $d\phi_H/dt$ and the first oscillator x.

The second oscillator generation unit 140 generates a second oscillator y according to a "second model" on the basis of the hip joint angle $\phi_H$ measured by the motion oscillator measurement unit 102 and the natural angular velocity $\omega_M$ set by the natural angular velocity setting unit 130.

The inducing oscillator generation unit 150 generates an inducing oscillator z on the basis of the second oscillator y generated by the second oscillator generation unit 140 and causes the walking assist device 200 to apply a torque F responsive to the inducing oscillator z to the user.

The functions of the walking assist device and its control system having the above configurations will be described below with reference to FIG. 2 and FIG. 3. The motion oscillator measurement unit 102 measures user's left and right hip joint angles $\phi_H = (\phi_{HL}, \phi_{HR})$ on the basis of an output from the hip joint angle sensor 212 (s101 in FIG. 2). In addition, the motion oscillator measurement unit 102 measures user's left and right hip joint angular velocities $d\phi_H/dt = (d\phi_{HL}/dt, d\phi_{HR}/dt)$ on the basis of an output from the hip joint angle sensor 212 (s102 in FIG. 2).

Figure 4:
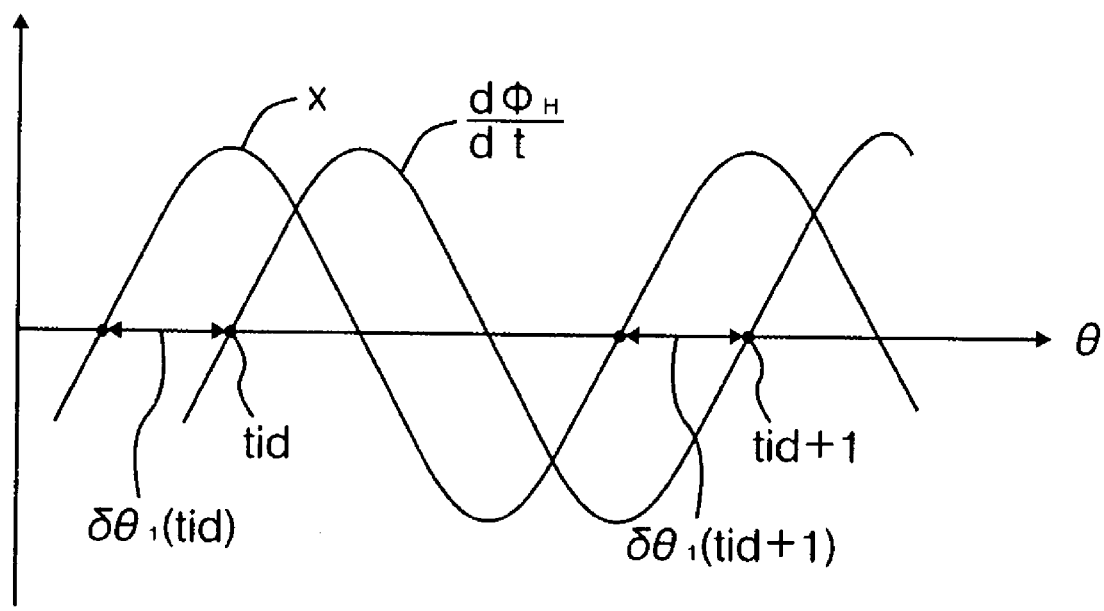
FIG. 4 is an illustrative relational diagram between a motion oscillator and a first fundamental oscillator.

Furthermore, the determination unit 104 determines whether the magnitude of periodic variation in the hip joint angular velocity $d\phi_H/dt$ measured by the motion oscillator measurement unit 102 exceeds the threshold value $\delta$. For example, as shown in FIG. 4, an interval between two time points $t_{id}$ and $t_{id+1}$ adjacent to each other satisfying $(d\phi_H/dt) = 0$ and $(d^2\phi_H/dt^2) > 0$ is assumed to be a period of the hip joint angular velocity $(d\phi_H/dt)$ and it is determined whether the magnitude of periodic variation $\{(t_{id+2} - t_{id+1}) - (t_{id+1} - t_{id})\}$ exceeds the threshold value $\delta$.

If the determination unit 104 determines that the magnitude of periodic variation in the hip joint angular velocity $d\phi_H/dt$ is equal to or lower than the threshold value $\delta$, the inducing oscillator z is generated according to the procedure below.

Figure 2:
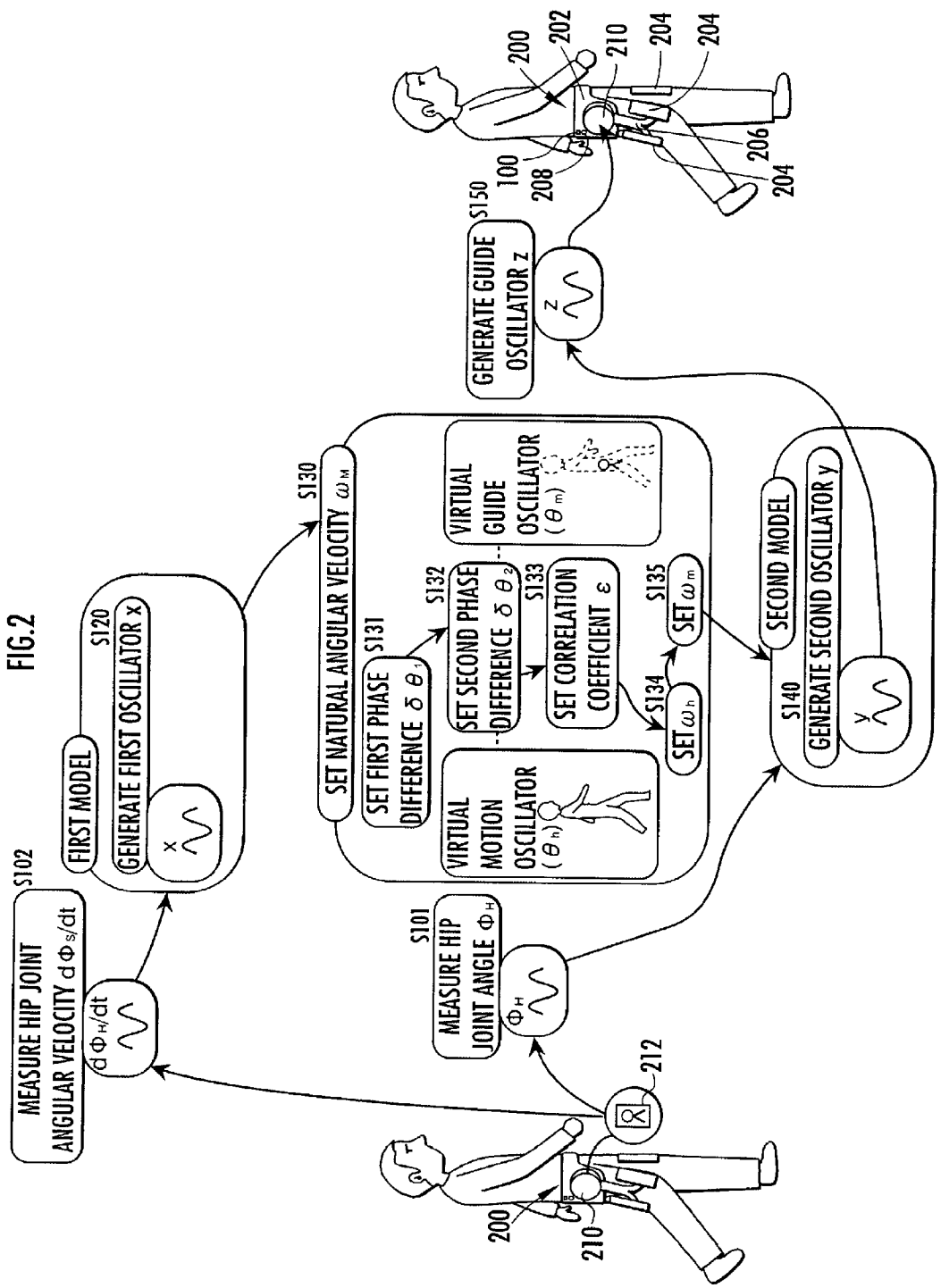
FIG. 2 is an illustrative functional diagram showing the motion inducing device and its control system according to the present invention.

The first oscillator generation unit 120 sets the first oscillator $x = (x_L, x_R)$ according to the "first model" on the basis of the hip joint angular velocity $d\phi_H/dt$ measured by the motion oscillator measurement unit 102 and the natural angular velocity $\omega_M = (\omega_{ML}, \omega_{MR})$ (s120 in FIG. 2). The first model shows a relationship between a plurality of virtual first elements such as virtual left and right legs whose output varies according to the motion oscillator such as the hip joint angular velocity $d\phi_H/dt$ by the van der Pol equation expressed by the following equation (1).

$$(d^2 x_L / dt^2) = \xi(1 - x_L^2)(dx_L/dt) - \omega_{ML}^2 x_L + g(x_L - x_R) + K(d\phi_{HL}/dt), \quad (1)$$

-continued $$(d^2 x_R/dt^2) = \xi(1-x_R^2)(dx_R/dt) - \omega_{MR}^2 x_R + g(x_R - x_L) + K(d\phi_{HR}/dt)$$

where "ξ" is a coefficient (>0) set so that the first oscillator x and its one time derivative (dx/dt) move along a stable limit cycle over the x-(dx/dt) plane. g is a first correlation coefficient representing a correlation between the virtual left and right legs (first elements) in the first model. K is a feedback coefficient. The natural angular velocity $\omega_M$ can be set arbitrarily within a range not widely deviating from an actual walking assist rhythm (walking assist rhythm) made by the walking assist device 200.

The first oscillator $x=(x_L, x_R)$ is set by the Runge-Kutta method. Components $x_L$ and $x_R$ of the first oscillator x represent virtual walking assist rhythms related to the left and right legs, respectively. In addition, due to the "mutual entrainment" which is one of the properties of the van der Pol equation, the oscillator x has a property of oscillating according to a change with respect to time in an autonomous rhythm reflecting the "natural angular velocity $\omega_M$" while harmonizing with the rhythm of the hip joint angular velocity (motion oscillator) $d\phi_H/dt$ which changes with respect to time in rhythm (angular velocity) almost equivalent to an actual walking rhythm.

Alternatively, the first oscillator x can be generated on the basis of the hip joint angle (first motion oscillator) $\omega_H$, the angle or angular velocity of the knee joint, ankle joint, shoulder joint, or elbow joint, and various oscillators varying with rhythm reflecting the user's walking rhythm (motion rhythm) such as a walker's landing sound, respiratory sound, or intermittent voice, instead of or in addition to the hip joint angular velocity (second motion oscillator) $d\phi_H/dt$.

Moreover, the "first model" can be represented by a van del Pol equation different in form from the van del Pol equation expressed by the equation (1) and can be represented by any kind of equation by which the oscillator can be generated with the mutual entrainment effect with the motion oscillator such as the hip joint angular velocity $d\phi_H/dt$.

Subsequently, the natural angular velocity setting unit 130 sets a new natural angular velocity $\omega_M$ on the basis of the hip joint angular velocity ($d\phi_H/dt$) measured by the motion oscillator measurement unit 102 and the first oscillator x generated by the first oscillator generation unit 120 (s130 in FIG. 2).

Specifically, a phase difference $\theta_H-\theta_M$ between the phase $\theta_H$ of the hip joint angular velocity ($d\phi_H/dt$) and the phase $\theta_M$ of the first oscillator x is set as a first phase difference $\delta\theta_1$ with respect to the left and right components (s131 in FIG. 2). For example, as shown in FIG. 4, a phase difference (first phase difference) $\delta\theta_1$ ($=\theta_H-\theta_M$) between the phase $\theta_H$ of the hip joint angular velocity ($d\phi_H/dt$) and the phase $\theta_M$ of the first oscillator x is set according to a time lag between a time point ( ..., $t_{id}$, $t_{id+1}$, ... ) satisfying ($d\phi_H/dt$)=0 and ($d^2\phi_H/dt^2$)>0 and a time point satisfying x=0 and (dx/dt)>0.

Subsequently, with a requirement that the first phase difference $\delta\theta_1$ was kept constant throughout the past three walking periods, a phase difference $\theta_h-\theta_m$ between a virtual motion oscillator $\theta_h$ and a virtual inducing oscillator $\theta_m$ expressed by the following equation (2.3) is set as a second phase difference $\delta\theta_2$ according to the "virtual models" expressed by the following equations (2.1) and (2.2) with respect to the left and right components (s132 in FIG. 2).

$$(d\theta_h/dt)=\omega_h+\epsilon\cdot\sin(\theta_m-\theta_h) \quad (2.1)$$

$$(d\theta_m/dt)=\omega_m+\epsilon\cdot\sin(\theta_h-\theta_m) \quad (2.2)$$

$$\delta\theta_2=\arcsin[(\omega_h-\omega_m)/2\epsilon] \quad (2.3)$$

where ε is a correlation coefficient between the virtual motion oscillator $\theta_h$ and the virtual inducing oscillator $\theta_m$ in the virtual models. In addition, $\omega_h$ is an angular velocity of the virtual motion oscillator $\theta_h$ and $\omega_m$ is an angular velocity of the virtual inducing oscillator $\theta_m$.

Subsequently, the correlation coefficient ε is set in such a way that a difference $\delta\theta_1-\delta\theta_2$ between the first phase difference $\delta\theta_1$ and the second phase difference $\delta\theta_2$ is minimum (s133 in FIG. 2). Specifically, the correlation coefficient ε is sequentially set in the discrete time ( ..., $t_{id-1}$, $t_{id}$, $t_{id+1}$, ... ) (see FIG. 4) satisfying the hip joint angular velocity (motion oscillator) $d\phi_H/dt=0$ with respect to the left and right components according to the following equation (2.4).

$$\epsilon(t_{id+1})=(t_{id})-\eta\{V(t_{id+1})-V(t_{id})\}/\{\delta(t_{id})-\epsilon(t_{id-1})\},$$
$$V(t_{id+1})\equiv(\tfrac{1}{2})\{\delta\theta_1(t_{id+1})-\delta\theta_2(t_{id})\}^2 \quad (2.4)$$

where the components in $\eta=(\eta_L, \eta_R)$ are coefficients representing the stability of the potential $V=(V_L, V_R)$ which brings the left and right components of the first phase difference $\delta\theta_1$ close to those of the second phase difference $\delta\theta_2$.

Subsequently, an angular velocity $\omega_h$ of the virtual motion oscillator $\theta_h$ is set according to the following equation (2.5) in such a way that the components of a difference $\delta\theta_1-\delta\theta_2$ between the first and second phase differences are minimum with respect to the left and right components on the condition that the natural angular velocity $\omega_m$ of the virtual inducing oscillator $\theta_m$ is kept constant on the basis of the correlation coefficient ε (s134 in FIG. 2).

$$\omega_h(t_{id}) = -\alpha\int dt\cdot([4\epsilon(t_{id})^2-\{\omega_h(t)-\omega_m(t_{id})\}^2]^{1/2}\times$$
$$\sin[\arcsin\{(\omega_h(t)-\omega_m(t_{id-1}))/2\epsilon(t_{id})\}-\delta\theta_1(t_{id})]) \quad (2.5)$$

where the components of $\alpha=(\alpha_L, \alpha_R)$ are coefficients representing the stability of a system.

Subsequently, with respect to each of the left and right components, the angular velocity $\omega_m$ of the virtual inducing oscillator $\theta_m$ is set as a new natural angular velocity $\omega_M$ on the basis of the angular velocity Oh of the virtual motion oscillator $\theta_h$ (s135 in FIG. 2). Specifically, the angular velocity $\omega_m=(\omega_{mL}, \omega_{mR})$ of the virtual inducing oscillator $\theta_m$ is set according to the following equation (2.6) in such a way that the second phase difference $\delta\theta_2$ approaches a target phase difference $\delta\theta_0$ with respect to the left and right components.

$$\omega_m(t_{id}) = \beta\int dt\cdot([4\epsilon(t_{id})^2-\{\omega_h(t_{id})-\omega_m(t)\}^2)\times\sin[\arcsin\{(\omega_h(t_{id})-\omega_m(t))/2\epsilon(t_{id})\}-\delta\theta_0]) \quad (2.6)$$

where the components of $\beta=(\beta_L, \beta_R)$ are coefficients representing the stability of a system.

Subsequently, the second oscillator generation unit 140 generates a second oscillator $y=(y_{L+}, y_{L-}, y_{R+}, y_{R-})$ according to the "second model" on the basis of the hip joint angle $\phi_H$ measured by the motion oscillator measurement unit 102 and the new natural angular velocity $\omega_M$ set by the natural angular velocity setting unit 130 (s140 in FIG. 2). The second model shows a relationship between a plurality of virtual second elements such as a plurality of virtual neural elements or the like which vary in output according to the hip joint angle $\phi_H$ or other motion oscillators. More specifically, the second model is expressed by the following simultaneous differential equation (3) including a state variable $u_i$ (i=L+, L−, R+, R−) corresponding to a change in membrane potential of neural elements L+ and L− which control the motions in the bending direction (forward) and in the stretching direction (backward) of the left thigh and neural elements R+ and R− which control the motions in the bending direction and in the stretching direction of the right thigh, respectively, and a self-control factor $v_i$ reflecting an adaptive effect of the neural element i.

$$\tau_{1L+} \cdot du_{L+}/dt = -u_{L+} + w_{L+/L-}y_{L-} + \qquad (3)$$
$$w_{L+/R+}y_{R+} - \lambda_L v_{L+} + f_1(\omega_{ML}) + f_2(\omega_{ML})K(\phi_{HL}),$$

$$\tau_{1L-} \cdot du_{L-}/dt = -u_{L-} + w_{L-/L+}y_{L+} + w_{L-/R-}y_{R-} -$$
$$\lambda_L v_{L-} + f_1(\omega_{ML}) + f_2(\omega_{ML})K(\phi_{HL}),$$

$$\tau_{1R+} \cdot du_{R+}/dt = -u_{R+} + w_{R+/L+}y_{L+} + w_{R+/R-}y_{R-} -$$
$$\lambda_R v_{R+} + f_1(\omega_{MR}) + f_2(\omega_{MR})K(\phi_{HR}),$$

$$\tau_{1R-} \cdot du_{R-}/dt = -u_{R-} + w_{R-/L-}y_{L-} + w_{R-/R+}y_{R+} -$$
$$\lambda_R v_{R-} + f_1(\omega_{MR}) + f_2(\omega_{MR})K(\phi_{HR}),$$

$$\tau_{2i} \cdot dv_i/dt = -v_i + y_i,$$

$$y_i = \max(0, u_i)$$

where $\tau_{ii}$ is a time constant which defines a variation character of the state variable $u_i$ and it has a dependence on the natural angular velocity $\omega_M$ as shown by the following equation (3.1) with respect to the left and right components.

$$\tau_{li} \equiv t(\omega_{ML})/\omega_{ML} - \gamma_L (i=L+, L-), \text{ or}$$
$$t(\omega_{MR})/\omega_{MR} - \gamma_R (i=R+, R-) \qquad (3.1)$$

where $t(\omega)$ is a coefficient having a dependence on $\omega$. $\gamma = (\gamma_L, \gamma_R)$ is a constant.

In addition, $\tau_{2i}$ is a time constant which defines a variation character of the self-control factor $v_i$. Moreover, $w_{i/j}$ (<0) is a second correlation coefficient (constant) representing a relationship between a plurality of virtual second elements (neural elements) i and j, and "$\gamma_L$" and "$\gamma_R$" are habituation coefficients. K is a feedback coefficient responsive to the hip joint angle $\phi_H$.

"$f_1$" and "$f_2$" are functions defined by the following equations (3.2) and (3.3).

$$f_1(\omega) \equiv c \cdot \omega (c>0) \qquad (3.2)$$

$$f_2(\omega) \equiv c_0 + c_1 \omega + c_2 \omega^2 \qquad (3.3)$$

Alternatively, the second oscillator $y_i$ can be generated on the basis of the hip joint angular velocity $d\phi_H/dt$, the angle or angular velocity of the knee joint, ankle joint, shoulder joint, or elbow joint, and various oscillators varying with rhythm linked to the walking rhythm such as a walker's landing sound, respiratory sound, or intentional voice, instead of or in addition to the hip joint angle $\phi_H$.

Subsequently, the inducing oscillator generation unit 150 generates an inducing oscillator z on the basis of the second oscillator $y_i$ generated by the second oscillator generation unit 140 (s150 in FIG. 2). Specifically, the inducing oscillator z is generated according to the following equation (4).

$$z_L = p_+ y_{L+} - p_- y_{L-},$$

$$z_R = -p_+ y_{R+} + p_- y_{R-} \qquad (4)$$

where $p_+$ and $p_-$ denote activating factors.

Then, current $I=(I_L, I_R)$ responsive to the inducing oscillator z generated by the inducing oscillator generation unit 150 is supplied from the battery 208 to the left and right actuators 210, and a force (torque around the hip joint) F acts on each of the user's thighs via the force transmitting member 206 and the thigh orthosis 204.

The above processes (s101, s102, ..., s150 in FIG. 2) are repeated afterward, by which the user walks with the torque around the hip joint F acting on the user's thigh by the walking assist device 200.

On the other hand, if the determination unit 104 determines that the magnitude of periodic variation in the hip joint angular velocity $d\phi_H/dt$ exceeds the threshold value $\delta$, the inducing oscillator z is generated according to the procedure below. If so, the setting of the natural angular velocity $\omega_M$ (s130 in FIG. 2) is omitted and the second oscillator y is generated by a different method from the above one.

Figure 3:
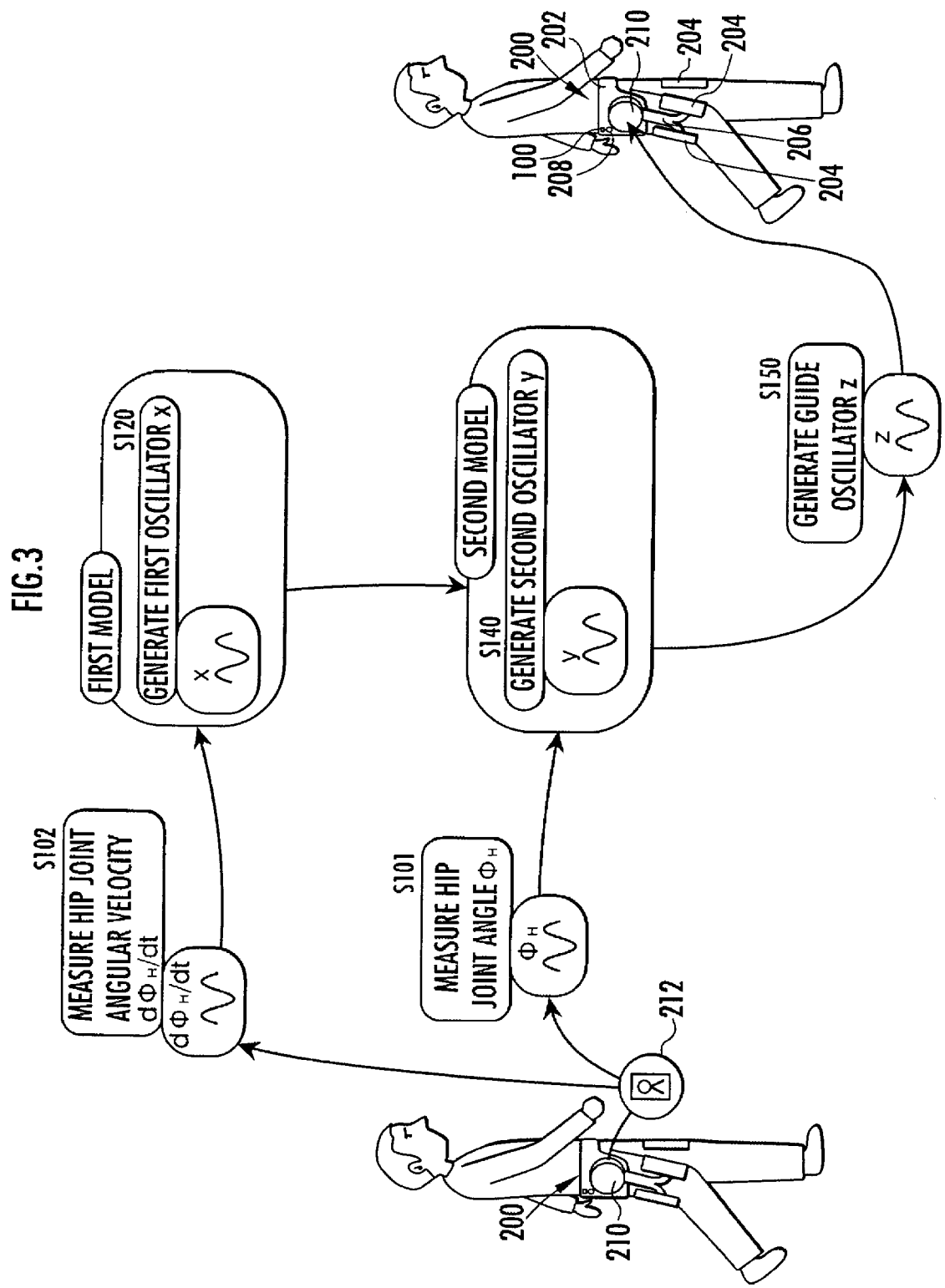
FIG. 3 is another illustrative functional diagram showing the motion inducing device and its control system according to the present invention.

Specifically, in this case, the second oscillator generation unit 140 generates the second oscillator $y=(y_{L+}, y_{L-}, y_{R+}, y_{R-})$ according to the "second model" on the basis of the hip joint angle $\phi_H$ measured by the motion oscillator measurement unit 102 and the angular velocity $\omega_{M1}$ of the first oscillator x generated by the first oscillator generation unit 120, instead of the natural angular velocity $\omega_M$ (s140 in FIG. 3). Thereafter, the inducing oscillator z is generated on the basis of the second oscillator y as described above (s150 in FIG. 3). Then, the current I responsive to the inducing oscillator z is supplied to the actuator 210 and the torque F around the hip joint is applied to the user.

According to the walking assist device 200 and its control system of the present invention which implement the above functions, the user's locomotion is induced (assisted) as described below in the case of a small change in the user's motion rhythm, in other words, if the magnitude of periodic variation in the hip joint angular velocity (motion oscillator) $d\phi_H/dt$ is equal to or lower than the threshold value $\delta$.

Specifically, first, the first oscillator x is generated (s120 in FIG. 2). The first oscillator x oscillates in an autonomous rhythm reflecting the natural angular velocity $\omega_M$ while harmonizing with the rhythm of the hip joint angular velocity (motion oscillator) ($d\phi_H/dt$) of the user due to the "mutual entrainment" effect which is one of the properties of the van der Pol equation (equation (1)). On the other hand, the first oscillator x is likely to have an inappropriate phase difference relative to the user's hip joint angular velocity ($d\phi_H/dt$) from the viewpoint of matching the user's walking rhythm with a target rhythm while harmonizing the user's walking rhythm with the inducing rhythm made by the walking assist device 200. Therefore, if the inducing oscillator z is directly generated from the first oscillator x, there is a possibility that the user's walking rhythm induced by the inducing oscillator z may deviate from the target rhythm.

Therefore, a new natural angular velocity $\omega_M$ is set according to the phase difference $\delta\theta_1$ between the user's hip joint angular velocity ($d\phi_H/dt$) and the first oscillator x (s130 in FIG. 2). Thereby, the new natural angular velocity $\omega_M$ becomes equivalent to an angular velocity $\theta_m$ of an appropriate oscillator (to which the virtual walking assist oscillator corresponds) from the viewpoint of inducing the user's motion in such a way as to match the user's motion rhythm with the target rhythm while harmonizing with the user's motion rhythm identified by the hip joint angular velocity ($d\phi_H/dt$) according to the target phase difference 600.

Therefore, the second oscillator y, which oscillates in rhythm reflecting the new natural angular velocity $\omega_M$, is generated (s140 in FIG. 2) and the inducing oscillator z is generated on the basis of the second oscillator y (s150 in FIG. 2), by which the user's motion rhythm can be matched with the target rhythm while harmonizing the user's motion rhythm induced by the inducing oscillator z and consequently by the torque F with the inducing rhythm made by the walking assist device 200. The harmony between the user's motion rhythm and the inducing rhythm of the walking assist device 200 harmonizes the inducing rhythm of the walking assist device 200 with the user's motion rhythm and harmonizes the user's motion rhythm with the inducing rhythm of the walking assist device 200, and thus the harmonization (mutual adaptation) is established between the user (human) and the device (machine).

Moreover, a new first oscillator x is generated so as to reflect the new natural angular velocity $\omega_M$ repeatedly (s120 in FIG. 2), by which a deviation of the phase difference $\delta\theta_1$ between the hip joint angular velocity $d\phi_H/dt$ and the first oscillator x from the target phase difference $\delta\theta_0$ can be gradually decreased while harmonizing the rhythm of the first oscillator x with the rhythm of the hip joint angular velocity (motion oscillator) $d\phi_H/dt$. Thereby, even if the user's motion rhythm changes suddenly, it is possible to achieve appropriate followability of the inducing oscillator z and further the torque F applied to the user's body to the change from the viewpoint of preventing discomfort or the like from being brought to the user, by which gradually the user's motion rhythm can coincide with the target rhythm at a moderate pace.

On the other hand, in the case of a significant change in the user's motion rhythm, in other words, if the magnitude of periodic variation in the hip joint angular velocity (motion oscillator) $d\phi_H/dt$ exceeds the threshold value $\delta$, the second oscillator y is generated according to the second model on the basis of the angular velocity $\omega_{M1}$ of the first oscillator x, instead of the natural angular velocity $\omega_M$ (s140 in FIG. 3)

When the second oscillator y is generated on the basis of the angular velocity $\omega_{M1}$ of the first motion oscillator x, the setting process (s130 in FIG. 2) of the natural angular velocity $\omega_M$ can be omitted. Some processes performed in the case of a small change in the user's motion rhythm can be omitted in this manner, by which the following corresponding reduction in time can be achieved: the time from the measurement of the hip joint angular velocity (motion oscillator) ($d\phi_H/dt$), through the generation of the inducing oscillator z, to the application of the force F responsive to the inducing oscillator z to the user's thigh.

Note that, however, in the case where the inducing oscillator z is directly generated from the motion oscillator such as the hip joint angular velocity $d\phi_H/dt$ or the first oscillator x, the inducing rhythm of the walking assist device 200 might deviate excessively from the motion rhythm in response to a sudden change in the user's motion rhythm and it might bring significant discomfort to the user. It is more noticeable in a situation where the user's motion rhythm is very likely to deviate from the target rhythm widely due to a significant change in the user's motion rhythm.

Therefore, the second oscillator y is generated according to the angular velocity $\omega_{M1}$ of the first oscillator x as described above (s140 in FIG. 3) and the inducing oscillator z is generated on the basis of the second oscillator y (s150 in FIG. 3), which prevents the user's motion rhythm from widely deviating from the motion inducing (assist) rhythm of the walking assist device 200. In addition, the angular velocity of the hip joint angular velocity (motion oscillator) ($d\phi_H/dt$) directly reflects the user's motion rhythm. Moreover, the user's motion rhythm is strongly reflected also on the angular velocity $\omega_{M1}$ of the first oscillator x which oscillates in the autonomous rhythm reflecting the natural angular velocity $\omega_M$ while harmonizing with the rhythm of the hip joint angular velocity ($d\phi_H/dt$) due to the "mutual entrainment" effect as described above. Therefore, the rhythm of the second oscillator y reflecting the angular velocity $\omega_{M1}$ of the first oscillator x reflects the user's motion rhythm that has suddenly changed. Accordingly, the inducing oscillator z is generated on the basis of the second oscillator y (s150 in FIG. 3), by which the inducing rhythm can be appropriate from the viewpoint of inducing the user's motion in such a way as to match the user's motion rhythm with the target rhythm while harmonizing with the user's motion rhythm.

As described above, according to the walking assist device 200 and its control system of the present invention, even after the user's motion rhythm changes suddenly, the user's motion can be induced in an appropriate rhythm according to the motion rhythm.

Furthermore, the first oscillator x is generated as an output of the first element according to the first model which represents the relationship between the plurality of virtual first elements (left and right legs) whose outputs vary according to the motion oscillator such as the hip joint angular velocity $d\phi_H/dt$ (equation (1), s120 in FIG. 2). This reflects the relationship between a plurality of actual elements related to a user's actual motion on the correlation represented by a coefficient g of the plurality of virtual first elements and the like in the first model, whereby an appropriate first oscillator x can be generated in view of the relationship between the plurality of actual elements. For example, in the case where a plurality of joints in the left and right legs or in the same leg are assumed as the plurality of actual elements, the first oscillator x is generated so as to reflect the qualitative relationship between the left and right legs such as in moving back and forth alternately or the qualitative relationship between joints in the same leg such as in a period or phase difference between the leg motion around a hip joint and the leg motion around a knee joint. Therefore, the rhythm and scale of the inducing oscillator which induces the user's motion can be made appropriate in view of the relationship concerned.

Furthermore, the second oscillator $y_i$ is generated as an output of the second element according to the second model which represents the relationship between the plurality of virtual second elements whose outputs vary according to the motion oscillator such as the hip joint angular velocity $d\phi_H/dt$ (equation (3), s140 in FIG. 2). This reflects the relationship between a plurality of actual elements related to a user's actual motion on the correlation represented by a coefficient $w_{i/j}$ of the plurality of virtual second elements in the second model, whereby an appropriate second oscillator can be generated in view of the relationship between the plurality of actual elements. For example, in the case where a plurality of user's neurons are assumed as a plurality of actual elements, the second oscillator $y_i$ is generated so as to reflect the qualitative relationship or the like between the neurons which control the walking by the left and right legs. Therefore, the rhythm and scale of the inducing oscillator which induces the user's motion can be made appropriate in view of the relationship concerned.

The experimental result of the operation and effect of the walking assist device 200 according to the present invention will be described below with reference to FIG. 5.

Figure 5A:
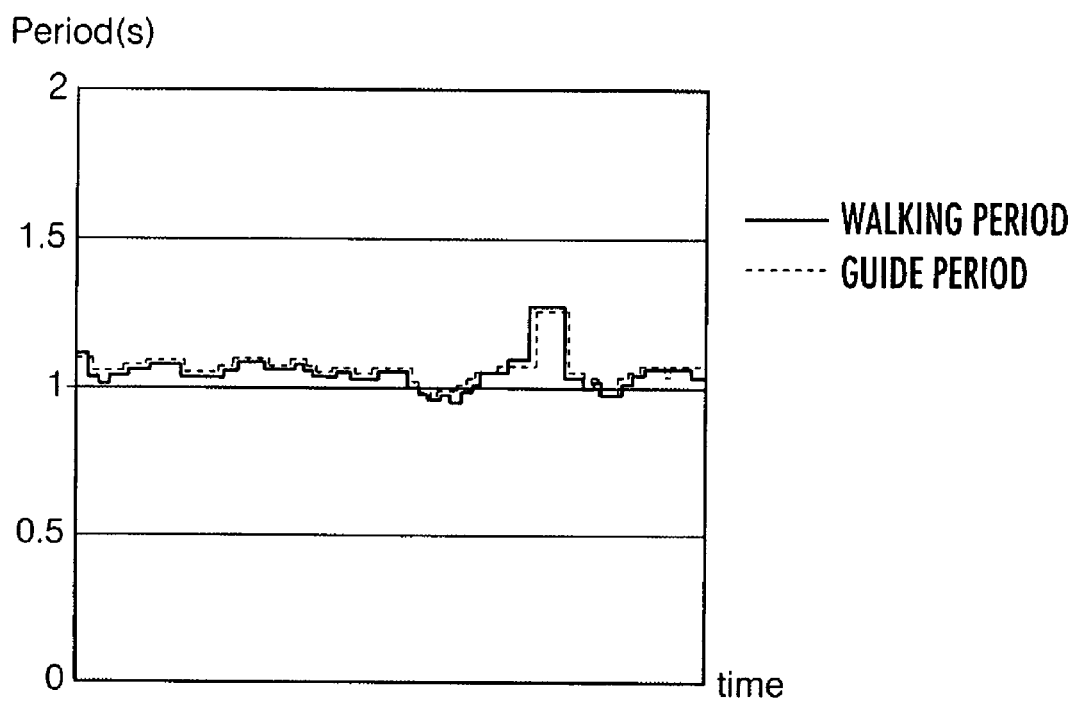
FIG. 5 is an explanatory diagram showing an experimental result of the operation and effect of the motion inducing device according to the present invention.
Figure 5B:
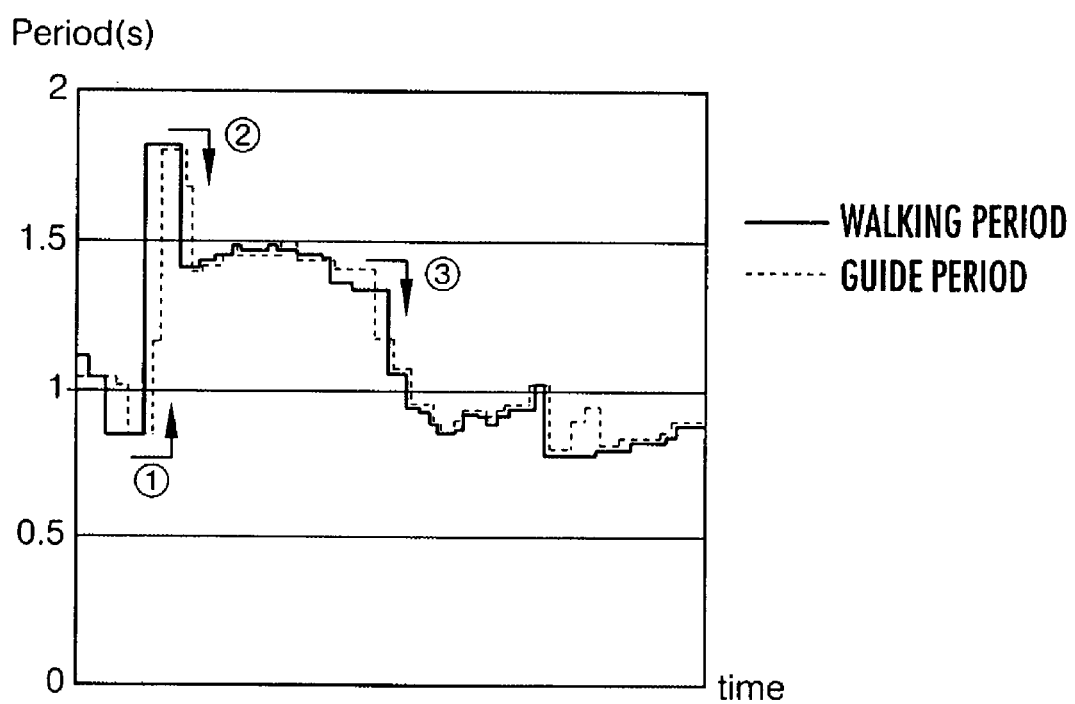

FIG. 5(*a*) shows the result of a measurement of the inducing rhythm made by the walking assist device 200 when the user walks in an almost uniform rhythm. In this case, the user's walking period ($=2\pi/$(an angular velocity $\theta_H$ Of the hip joint angular velocity $d\phi_H/dt$)) is kept almost constant as indicated by the solid line in FIG. 5(*a*). In addition, the inducing period (walking assist period) made by the walking assist device 200 follows the user's walking period as indicated by the dashed line in FIG. 5(*a*).

FIG. 5(*b*) shows the result of a measurement of the inducing rhythm made by the walking assist device 200 when the user walks while rather significantly changing the walking rhythm. In this case, the user's walking period significantly changes as indicated by the solid line in FIG. 5(*b*) (arrows 1 to 3 in FIG. 5(*b*)). In addition, the inducing period made by the walking assist device 200 significantly changes following the user's walking period which widely changes as indicated by the dashed line in FIG. 5(*b*).

As apparent from the experimental result, according to the walking assist device (motion inducing device) 200 of the present invention, even after the user's motion rhythm changes suddenly, the user's motion can be induced in an appropriate rhythm responsive to the motion rhythm.

While the user's walking is induced in this embodiment, it is possible to assist any other motion such as, for example, user's handwork on manufacturing a product such as an automobile as another embodiment.

While the torques F around the left and right hip joints are applied to the user's body according to the inducing oscillator z in the above embodiment, torques around various joints such as the knee joint, ankle joint, shoulder joint, elbow joint, and carpal joint can be applied to the user's body according to the inducing oscillator z as another embodiment. The combination of joints to which the torques are applied can be altered in various ways according to the user's demand. Furthermore, it is possible to provide the user according to the inducing oscillator z with a periodic sound audibly perceptible by a walker through an audio device (not shown) such as a headphone, a periodic light or sign perceptible through a visual device (not shown) such as goggles, or a periodic knock perceptible by the walker through some tactile senses of the body such as his/her back or shoulder by means of a massager or the like as another embodiment.

Although the more the types of motion oscillators are to be measured, the more the correlation terms are in the nonlinear differential equation (equation (1)) based on the generation of the first oscillator x such as a van del Pol equation or in the nonlinear differential equation (equation (3)) based on the generation of the second oscillator $y_i$, the adjustment of the correlation coefficient enables more careful motion induction in consideration of the motions of various parts of the user's body.

While the second oscillator y is generated according to the second model on the basis of the angular velocity $\omega_{M1}$ of the first oscillator x, instead of the natural angular velocity $\omega_M$, if the magnitude of periodic variation in the hip joint angular velocity ($d\phi_H/dt$) exceeds the threshold value $\delta$ (s140 in FIG. 3) in the above embodiment, it is also possible to generate the second oscillator y on the basis of an angular velocity of the motion oscillator such as the hip joint angular velocity $d\phi_H/dt$ or an average or weighted mean value between the angular velocity of the motion oscillator such as the hip joint angular velocity $d\phi_H/dt$ and the angular velocity $\omega_{M1}$ of the first oscillator x, instead of the natural angular velocity $\omega_M$ in the above case as another embodiment.

While the inducing oscillator z is generated according to the equation (4) in the above embodiment, the inducing oscillator z can be generated according to the following procedure as another embodiment.

First, the first inducing oscillator $z_1$ is generated according to the following equation (5).

$$z_{1L} = g_{1+}(\omega_{ML})g_+(\phi_{HL})y_{L+} - g_{1-}(\omega_{ML})g_-(\phi_{HL})y_{L-},$$

$$z_{1R} = g_{1+}(\omega_{MR})g_+(\phi_{HR})y_{R+} - g_{1-}(\omega_{MR})g_-(\phi_{HR})y_{RL-}, \quad (5)$$

where "$g_{1+}$", "$g_{1-}$", "$g_{1+}$", and "$g_{1-}$" are functions defined according to the following equations (5.1) to (5.4), respectively.

$$g_{1+}(\omega) \equiv \Sigma_k a_{k+}\omega^k \; (a_{k+}: \text{Coefficient, } k=0\sim3) \quad (5.1)$$

$$g_{1-}(\omega) \equiv \Sigma_k a_{k-}\omega^k \; (a_{k-}: \text{Coefficient, } k=0\sim3) \quad (5.2)$$

$$g_+(\phi) \equiv c_{1+}(\phi - \phi_{0+}) + c_{2+}(\phi - \phi_{0+})^3$$

($c_{1+}, c_{2+}$: Coefficient, $\phi_{0+}$: Target value of hip joint angle $\phi_H$ in bending direction) (5.3)

$$g_-(\phi) \equiv c_{1-}(\phi - \phi_{0-}) + c_{2-}(\phi - \phi_{0-})^3$$

($c_{1-}, c_{2-}$: Coefficient, $\phi_{0-}$: Target value of hip joint angle $\phi_H$ in stretching direction) (5.4)

Figure 6:
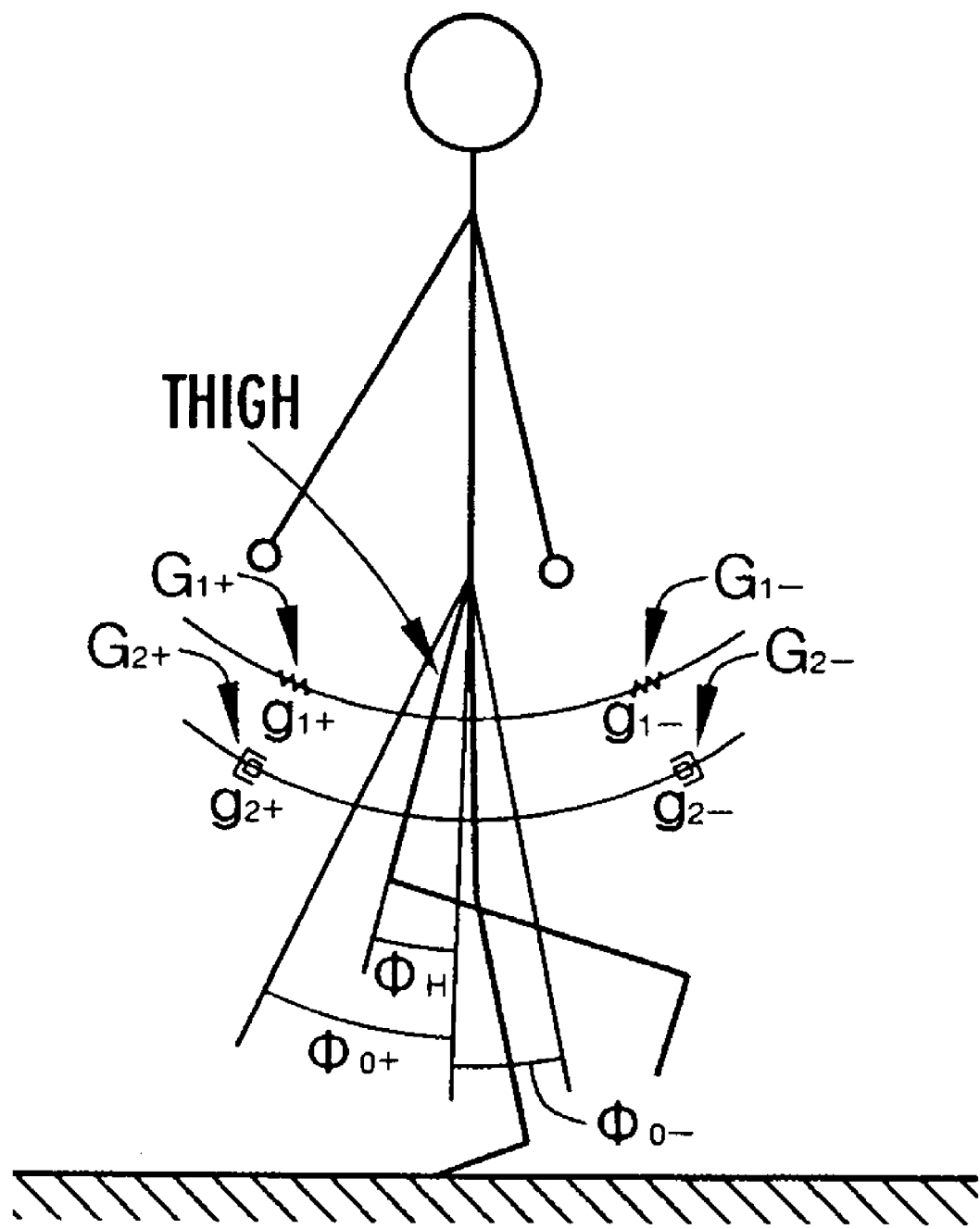
FIG. 6 is an explanatory diagram of virtual springs and dampers related to the generation of inducing oscillators.

The first inducing oscillator $z_1$ is understood as an elastic force of two virtual springs $G_{1+}$ and $G_{1-}$ shown in FIG. 6 having the first coefficients $g_{1+}$ and $g_{1-}$ as spring coefficients (elastic coefficients). The first coefficients $g_{1+}$ and $g_{1-}$ specify the gradient of a first potential (a potential of a virtual spring (elastic element)) which brings the hip joint angle (the motion oscillator responsive to the user's motion scale) $\phi_H$ close to the target value $\phi_{0+}$ (>0) and $\phi_{0-}$ (<0) responsive to the user's target motion scale, according to the natural angular velocity $\omega_M$ (see equations (5.1) and (5.2)). More specifically, the first inducing oscillator $z_1$ is represented as an elastic force of the elastic elements such as virtual springs or the like which have the first coefficients $g_{1+}$ and $g_{1-}$ responsive to the first potential as elastic coefficients (spring coefficients) and which restores the value of the hip joint angle (the motion oscillator responsive to the user's motion scale) $\phi_H$ to the target value $\phi_0$. This enables the user's motion to be induced with the rhythm and scale reflecting the elastic elements of the user's body such as the elastic force generated during the transition from the muscle contraction state to the muscle stretch state.

The elastic force of one virtual spring $G_{1+}$ acts on the user's thigh in such a way as to bring the hip joint angle $\phi_H$ close to the target value $\phi_{0+}$ according to the spring coefficient $g_{1+}$ (see equation (5)). Specifically, if the hip joint angle $\phi_H$ is less than the target value $\phi_{0+}$, the elastic force of the spring $G_{1+}$ acts on the thigh in such a way as to move the thigh in the direction of increasing the hip joint angle $\phi_H$ (forward). In addition, if the hip joint angle $\phi_H$ exceeds the target value $\phi_{0+}$, the elastic force of the spring $G_{1+}$ acts on the thigh in such a way as to move the thigh in the direction of decreasing the hip joint angle $\phi_H$ (backward).

Moreover, the elastic force of the other virtual spring $G_1$ acts on the user's thigh in such a way as to bring the hip joint angle $\phi_H$ close to the target value $\phi_{0-}$ according to the spring coefficient $g_{1-}$ (see equation (5)). Specifically, if the hip joint angle $\phi_H$ exceeds the target value $\phi_{0-}$, the elastic force of the spring $G_{1-}$ acts on the thigh in such a way as to move the thigh in the direction of decreasing the hip joint angle $\phi_H$ (backward). In addition, if the hip joint angle $\phi_H$ is less than the target value $\phi_{0-}$, the elastic force of the spring $G_{1-}$ acts on the thigh in such a way as to move the thigh in the direction of increasing the hip joint angle $\phi_H$ (forward).

The target values $\phi_{0+}$ and $\phi_{0-}$ of the hip joint angle $\phi_H$ are set according to the geometric condition of the leg stance including the user's hip joint angle $\phi_H$ with reference to the target motion scale (step length). Additionally, the coefficients $a_{k+}$ and $a_{k-}$ included in the first coefficients $g_{1+}(\omega_M)$ and $g_{1-}(\omega_M)$, which are the functions of a new natural angular velocity $\omega_M$, respectively, can be set as coefficients responsive to the target motion rhythm (walking rate (=the number of steps per unit time (for example, one minute)).

Alternatively, the target values $\phi_{0+}$ and $\phi_{0-}$ of the hip joint angle $\phi_H$ can be set according to the geometric condition of the leg stance including the user's hip joint angle $\phi_H$ on the basis of the target "step length" set by the user through the operation of a set button (not shown) provided in the walking assist device 200. In addition, the coefficients $a_{k+}$ and $a_{k-}$ included in the first coefficients $g_{1+}(\omega_M)$ and $g_{1-}(\omega_M)$, respectively, can be set according to the target "walking rate" set by the user through the operation of a set button (not shown) provided in the walking assist 200.

Furthermore, a second inducing oscillator $z_2$ is generated according to the following equation (6).

$$z_{2L} = -g_{2+}(\omega_{ML})(d\phi_{HL}/dt)H_+(\phi_{HL})y_{L+} + \quad (6)$$
$$g_{2-}(\omega_{ML})(d\phi_{HL}/dt)H_-(\phi_{HL})y_{L-},$$
$$z_{2R} = -g_{2+}(\omega_{MR})(d\phi_{HR}/dt)H_+(\phi_{HR})y_{R+} +$$
$$g_{2-}(\omega_{MR})(d\phi_{HR}/dt)H_-(\phi_{HR})y_{R-}$$

where "$g_{2+}$", "$g_{2-}$", "$H_+$", and "$H_-$" are functions defined according to the following equations (6.1) to (6.4), respectively.

$$g_{2+}(\omega) \equiv \Sigma_k b_{k+} \omega^k \ (b_{k+}\text{: Coefficient, k=0~3}) \quad (6.1)$$
$$b_{1-}(\omega) \equiv \Sigma_k b_{k-} \omega^k \ (b_{k-}\text{: Coefficient, k=0~3}) \quad (6.2)$$
$$H_+(\phi) \equiv 0(\phi \leq 0), 1(\phi > 0) \quad (6.3)$$
$$H_-(\phi) \equiv 0(\phi > 0), 1(\phi \leq 0) \quad (6.4)$$

The second inducing oscillator $z_2$ is understood as a damping force of two virtual dampers $G_{2+}$ and $G_{2-}$ shown in FIG. 4 having the second coefficients $g_{2+}$ and $g_{2-}$ as damper coefficients (damping coefficients). The second coefficients $g_{2+}$ and $g_{2-}$ specify the gradient of a second potential (a potential of a virtual damper (damping element)) which prevents the increase in the absolute value of the hip joint angle $\phi_H$, according to the natural angular velocity $\omega_M$ (see equations (6.1) and (6.2)). More specifically, the second inducing oscillator $z_2$ is represented as a damping force of the damping elements such as virtual dampers or the like which have the second coefficients $g_{2+}$ and $g_{2-}$ responsive to the second potential as damping coefficients (damper coefficients) and which prevents the increase in the absolute value of the hip joint angle (the motion oscillator responsive to the user's motion scale) $\phi_H$, according to the hip joint angular velocity (the motion oscillator time derivative responsive to the user's motion scale) $d\phi_H/dt$. This enables the user's motion to be induced with the rhythm and scale reflecting the damping elements of the user's body such as the viscous force generated during the transition from the muscle stretch state to the muscle flexed state.

The damping force of one virtual damper $G_{2+}$ acts on the user's thigh in such a way as to prevent the increase in the absolute value of the hip joint angle $\phi_H$ toward the front side (inflection side), according to the damper coefficient $g_{2+}$ and the hip joint angular velocity $d\phi_H/dt$ (see equation (6)). In other words, the damping force of the damper $G_{2+}$ acts on the thigh in such a way as to prevent the thigh from excessively moving forward.

Moreover, the damping force of the other virtual damper $G_{2-}$ acts on the user's thigh in such a way as to prevent the increase in the absolute value of the hip joint angle $\phi_H$ toward the back side (stretch side), according to the damper coefficient $g_{2-}$ and the hip joint angular velocity $d\phi_H/dt$ (see equation (6)). In other words, the damping force of the damper $G_{2-}$ acts on the thigh in such a way as to prevent the thigh from excessively moving backward.

Moreover, the second inducing oscillator $z_2$ includes step functions $H_+$ and $H_-$ as the functions of the hip joint angle $\phi_H$. Therefore, it is possible to avoid such a situation that the damping forces of the two virtual dampers $G_{2+}$ and $G_{2-}$ are offset from each other. The coefficients $b_{k+}$ and $b_{k-}$ included in the second coefficients $g_{2+}(\omega_M)$ and $g_{2-}(\omega_M)$, respectively, which are the functions of the natural angular velocity $\omega_M$, can be set as coefficients responsive to the target motion rhythm. Alternatively, the coefficients $b_{k+}$ and $b_{k-}$ can be set according to the target "walking rate" set by the user through the operation of a set button (not shown) provided in the walking assist device 200.

The inducing oscillator $z$ $(=z_1+z_2)$ is generated by the combination of the first inducing oscillator $z_1$ and the second inducing oscillator $z_2$ generated by the inducing oscillator generation unit 150.

According to the walking assist device 200 of another embodiment, the user's walking motion or any other motion can be induced (assisted) in such a way as to bring the user's motion scale close to the target scale for the reason described below.

Specifically, the first coefficients $g_{1+}$ and $g_{1-}$ included in the first inducing oscillator $z_1$ are provided according to the first potential (the potential of the virtual elastic elements) for bringing the user's hip joint angle (the motion oscillator according to the user's motion scale) $\phi_H$ close to the target values $\phi_{0+}$ and $\phi_{0-}$. The first coefficients $g_{1+}$ and $g_{1-}$ are provided according to the natural angular velocity $\omega_M$ (=an angular velocity $\omega_m$ of the virtual inducing oscillator $\theta_m$) (see equations (5.1) and (5.2)). The natural angular velocity $\omega_M$ corresponds to an angular velocity of an appropriate oscillator from the viewpoint of inducing the user's motion in such a way as to match the user's motion rhythm with the target rhythm while harmonizing with the user's motion rhythm as described above.

Moreover, the second coefficients $g_{2+}$ and $g_{2-}$ included in the second inducing oscillator $z_2$ are provided according to the second potential (the potential of the virtual damping elements) for preventing the increase in the absolute value of the user's hip joint angle (the motion oscillator according to the user's motion scale) $\phi_H$. The second coefficients $g_{2+}$ and $g_{2-}$ are provided according to the natural angular velocity $\omega_M$ (see equations (6.1) and (6.2)). The natural angular velocity $\omega_M$ corresponds to an angular velocity of an appropriate oscillator from the viewpoint of inducing the user's motion in such a way as to match the user's motion rhythm with the target rhythm while harmonizing with the user's motion rhythm as described above.

Therefore, the first oscillator $z_1$ is generated so as to reflect the first coefficients $g_{1+}(\omega_M)$ and $g_{1-}(\omega_M)$ according to the new natural angular velocity $\omega_M$ and the second inducing oscillator $z_2$ is generated so as to reflect the second coefficients $g_{2+}(\omega_M)$ and $g_{2-}(\omega_M)$ according to the natural angular velocity $\omega_M$, whereby the user's motion can be induced in such a way as to bring the user's motion scale close to the target scale while harmonizing the user's motion rhythm with the inducing oscillator z, and further the rhythm of the force F applied to the user's thigh and matching the user's motion rhythm with the target rhythm.

The control system of the walking assist device 200 according to another embodiment of the present invention can further include a state measurement unit which measures one or both of the user's motion state and physiological state and a threshold value setting unit which sets the threshold value $\delta$ according to one or both of the user's motion state and physiological state determined by the state measurement unit. The user's "motion state" can include an upward walking state where the user ascends a slope or stairs, a level walking state where the user walks on substantially level ground, a downward walking state where the user descends a slope or stairs, a quick walking state where the user walks quickly, and a slow walking state where the user walks slowly. Additionally, the user's "physiological state" can include a state where the user's degree of fatigue is high, a state where the user's degree of fatigue is low, a state where the user's heart rate or perspiration amount is high, a state where the user's heart rate is low, and the like.

According to the motion inducing device having the above configuration, the threshold value $\delta$ is set according to one or both of the user's "motion state" and "physiological state" in view of the fact that it would be better to increase the response of the inducing rhythm made by the motion inducing device to a change in the user's motion rhythm in some cases, while it would be better to decrease the response in other cases, depending on the user's "motion state" or "physiological state." For example, depending on the user's motion state (for example, in the downward walking state or the quick walking state), it would be better to decrease the response of the inducing rhythm of the walking assist device 200 in some cases even in the case of a significant change in the user's motion rhythm. On the other hand, depending on the user's motion state (for example, in the upward walking state or the slow walking state), it would be better to increase the response of the inducing rhythm made by the walking assist device 200 in some cases even in the case of a small change in the user's motion rhythm.

In the case of a significant change in the user's motion rhythm on that basis, in other words, if the magnitude of periodic variation in the motion oscillator such as the hip joint angular velocity $d\phi_H/dt$ exceeds the threshold value $\delta$, the setting process (s130 in FIG. 2) of the natural angular velocity $\omega_M$ can be omitted and then the inducing oscillator T can be generated as describe above. Furthermore, the second oscillator y which oscillates in rhythm reflecting the angular velocity $\omega_{M1}$ of the first oscillator x, instead of the natural angular velocity $\omega_M$ is generated (s140 in FIG. 3), and the inducing oscillator z is generated on the basis of the second oscillator y (s150 in FIG. 3). Thereby, the response of the walking assist rhythm (inducing rhythm) made by the walking assist device 200 to a change in the user's motion rhythm can be adjusted to an appropriate one, in view of the user's motion state and physiological state.

The user's walking state (motion state) can be measured, for example, in the following procedure.

Specifically, the correspondence between the user's walking state and a track pattern formed on an n-dimensional space by n motion oscillators is read from the memory. Thereafter, the user's "walking state" is measured on the basis of the correspondence and the track pattern formed on the n-dimensional space by the n motion oscillators including the hip joint angular velocity $d\phi_H/dt$ measured by the motion oscillator measurement unit 102. As the motion oscillators for the walking state measurement, it is possible to measure the hip joint angle $\phi_H$, the angle, angular velocity, or angular acceleration of the knee joint, ankle joint, shoulder joint, or elbow joint, the position of a part of a leg of the user, and various parameters which vary with rhythm linked to the walking rhythm, such as a walker's landing sound, respiratory sound, intentional voice, or the like.

Moreover, the control system of the walking assist device 200 can further include a first correlation adjustment unit which adjusts the coefficient g (the correlation between the plurality of virtual first elements) in the first model according to one or both of the user's motion state and physiological state determined by the state measurement unit. Furthermore, the control system of the walking assist device 200 can further include a second correlation adjustment unit which adjusts the coefficient $w_{ij}$ (the correlation between the plurality of virtual second elements (virtual neural elements)) in the second model according to one or both of the user's motion state and physiological state determined by the state measurement unit.

According to the walking assist device 200 of the present invention, the user's motion can be induced in real time with an appropriate rhythm and scale according to the user's state so as to reflect a fact that the relationship between a plurality of actual elements such as the left and right legs varies with the user's "motion state" or "physiological state."

Moreover, if the inducing oscillator z is generated by combining the first inducing oscillator $z_1$ and the second inducing oscillator $z_2$ (see equations (5) and (6)), alternatively coefficients ($\phi_{0+}, \phi_{0-}, a_{k+}, a_{k-}, b_{k+}, b_{k-}, \ldots$) and the like responsive to the target rhythm and scale of the user's motion can be set according to one or both of the user's motion state and physiological state. Thereby, the user's motion can be induced with an appropriate rhythm and scale from the viewpoint of matching the user's motion rhythm and scale with the target rhythm and scale responsive to the user's "walking state," respectively.

Furthermore, the target phase difference 600 can be set according to one or both of the user's motion state and physiological state. Thereby, the user's motion can be induced in such a way that the phase difference between the user's hip joint angular velocity (motion oscillator) $d\phi_H/dt$ and the inducing oscillator z (and further torque F) of the walking assist device 200 approaches the target phase difference $\delta\theta_0$ responsive to the user's "walking state." This enables the user's motion to be induced (assisted) in an appropriate rhythm from the viewpoint of bringing the user's motion rhythm close to the target rhythm according to the change in the user's walking state.

The invention claimed is:

1. A motion inducing device for inducing a user's motion according to an inducing oscillator, comprising:
a motion oscillator measurement means which measures a user's motion oscillator;
a first oscillator generation means which generates a first oscillator which attains mutual entrainment with the motion oscillator measured by the motion oscillator measurement means by using a first model defined by a natural angular velocity in such a way as to reflect the natural angular velocity to an angular velocity of the first oscillator;
a natural angular velocity setting means which modifies the natural angular velocity based on a phase difference between the motion oscillator measured by the motion oscillator measurement means and the first oscillator generated by the first oscillator generation means;
a second oscillator generation means which generates a second oscillator oscillating in rhythm reflecting the modified natural angular velocity set by the natural angular velocity setting means; and
an inducing oscillator generation means which generates the inducing oscillator based on the second oscillator generated by the second oscillator generation means,
wherein the second oscillator generation means generates the second oscillator which oscillates in rhythm reflecting one or both of an angular velocity of the motion oscillator measured by the motion oscillator measurement means and the angular velocity of the first oscillator generated by the first oscillator generation means, instead of the modified natural angular velocity set by the natural angular velocity setting means, when a magnitude of periodic variation in the motion oscillator measured by the motion oscillator measurement means exceeds a threshold value.

2. The motion inducing device according to claim 1, further comprising:
a state measurement means which measures one or both of user's motion and physiological states; and
a threshold value setting means which sets the threshold value according to one or both of the user's motion and physiological states determined by the state measurement means.

3. The motion inducing device according to claim 1, further comprising:
a state measurement means which measures one or both of user's motion and physiological states; and
a weight setting means which sets a weight of the angular velocity of the motion oscillator and a weight of the angular velocity of the first oscillator according to one or both of the user's motion and physiological states measured by the state measurement means,
wherein the second oscillator generation means generates a second oscillator which oscillates in rhythm reflecting a weighted mean angular velocity, which is set by the weight setting means, between the angular velocity of the motion oscillator and the angular velocity of the first oscillator.

4. The motion inducing device according to claim 1, wherein the inducing oscillator generation means generates an inducing oscillator including the second oscillator generated by the second oscillator generation means and a first inducing oscillator having a first potential for bringing the motion oscillator responsive to a user's motion scale measured by the motion oscillator measurement means close to a target value responsive to a user's target motion scale according to the modified natural angular velocity set by the natural angular velocity setting means.

5. The motion inducing device according to claim 4, wherein the inducing oscillator generation means generates the first inducing oscillator, which includes a product of a first coefficient responsive to the first potential as a function of the modified natural angular velocity set by the natural angular velocity setting means, a function of a deviation between a first motion oscillator value and the target value, and the second oscillator.

6. The motion inducing device according to claim 1, wherein the inducing oscillator generation means generates an inducing oscillator including a second inducing oscillator having a second potential which prevents an increase in an absolute value of the motion oscillator, according to the modified natural angular velocity set by the natural angular velocity setting means and a time derivative of the motion oscillator responsive to a user's motion scale measured by the motion oscillator measurement means.

7. The motion inducing device according to claim 6, wherein the inducing oscillator generation means generates the second inducing oscillator which includes a product of a second coefficient responsive to the second potential as a function of the modified natural angular velocity set by the natural angular velocity setting means, a function of the time derivative of the motion oscillator responsive to the user's motion scale, and the second oscillator.

8. A control system which controls a device for inducing a user's motion according to an inducing oscillator, comprising:
a motion oscillator measurement means which measures a user's motion oscillator;
a first oscillator generation means which generates a first oscillator which attains mutual entrainment with the motion oscillator measured by the motion oscillator measurement means by using a first model defined by a natural angular velocity in such a way as to reflect the natural angular velocity to an angular velocity of the first oscillator;
a natural angular velocity setting means which modifies the natural angular velocity based on a phase difference between the motion oscillator measured by the motion oscillator measurement means and the first oscillator generated by the first oscillator generation means;
a second oscillator generation means which generates a second oscillator oscillating in rhythm reflecting the modified natural angular velocity set by the natural angular velocity setting means; and
an inducing oscillator generation means which generates the inducing oscillator based on the second oscillator generated by the second oscillator generation means,
wherein the second oscillator generation means generates the second oscillator which oscillates in rhythm reflecting one or both of an angular velocity of the motion oscillator measured by the motion oscillator measurement means and the angular velocity of the first oscillator generated by the first oscillator generation means, instead of the modified natural angular velocity set by the natural angular velocity setting means, if the magnitude of a periodic variation in the motion oscillator measured by the motion oscillator measurement means exceeds a threshold value.

9. A control program which provides a computer attached to a device for inducing a user's motion according to an inducing oscillator with functions for controlling the device including:
a motion oscillator measurement function of measuring a user's motion oscillator;
a first oscillator generation function of generating a first oscillator which attains mutual entrainment with the motion oscillator measured by the motion oscillator measurement function by using a first model defined by a natural angular velocity in such a way as to reflect the natural angular velocity to an angular velocity of the first oscillator;
a natural angular velocity setting function of modifying the natural angular velocity based on a phase difference between the motion oscillator measured by the motion oscillator measurement function and the first oscillator generated by the first oscillator generation function;
a second oscillator generation function of generating a second oscillator oscillating in rhythm reflecting the modified natural angular velocity set by the natural angular velocity setting function;
an inducing oscillator generation function of generating the inducing oscillator based on the second oscillator generated by the second oscillator generation function; and
a function of generating the second oscillator as a part of the second oscillator generation function, wherein the second oscillator oscillates in rhythm reflecting one or both of an angular velocity of the motion oscillator measured by the motion oscillator measurement function and the angular velocity of the first oscillator generated by the first oscillator generation function, instead of the modified natural angular velocity set by the natural angular velocity setting function when the magnitude of a periodic variation in the motion oscillator measured by the motion oscillator measurement function exceeds a threshold value.

* * * * *